United States Patent [19]

Visser et al.

[11] Patent Number: 5,194,803
[45] Date of Patent: * Mar. 16, 1993

[54] SUPERCONDUCTIVE VOLTAGE STABILIZER HAVING IMPROVED CURRENT SWITCH

[75] Inventors: Age T. Visser, Geneva, Ill.; Carel C. DeWinkel, Madison, Wis.

[73] Assignee: Superconductivity, Inc., Middleton, Wis.

[*] Notice: The portion of the term of this patent subsequent to Oct. 9, 2007 has been disclaimed.

[21] Appl. No.: 594,273

[22] Filed: Oct. 9, 1990

Related U.S. Application Data

[63] Continuation-in-part of Ser. No. 385,014, Jul. 25, 1989, Pat. No. 4,962,354.

[51] Int. Cl.$^5$ .............................................. H01F 36/00
[52] U.S. Cl. ................... 323/360; 323/223; 363/14; 505/869
[58] Field of Search ................ 323/223, 360; 363/14, 363/37, 124, 125

[56] References Cited

U.S. PATENT DOCUMENTS

| | | | |
|---|---|---|---|
| 2,987,631 | 6/1961 | Park, Jr. | 336/DIG. 1 |
| 3,243,654 | 3/1966 | Wright | 315/289 |
| 3,701,906 | 10/1972 | Denel et al. | 307/149 |
| 3,800,256 | 3/1974 | Garwin | 335/216 |
| 4,079,305 | 3/1978 | Peterson et al. | 363/14 |
| 4,122,512 | 10/1978 | Peterson et al. | 363/14 |
| 4,348,630 | 9/1982 | Boenig et al. | 323/360 |
| 4,431,960 | 2/1984 | Zucker | 323/340 |
| 4,438,474 | 3/1984 | Paice | 361/58 |
| 4,584,518 | 4/1986 | Higashino et al. | 363/14 |
| 4,591,776 | 5/1986 | Sabrie | 318/717 |
| 4,599,519 | 7/1986 | Boenig | 363/14 |
| 4,609,831 | 9/1986 | Higashino et al. | 307/270 |
| 4,695,932 | 9/1987 | Higashino | 363/124 |
| 4,962,354 | 10/1990 | Visser et al. | 323/360 |

*Primary Examiner*—Jeffrey L. Sterrett
*Attorney, Agent, or Firm*—McAndrews, Held & Malloy, Ltd.

[57] ABSTRACT

A superconductive voltage stabilizer employs an improved current switch. The improved current switch controls the release of current stored in an energy storage device or superconducting inductive energy storage coil for selective delivery of the current to a load or an electric utility system. A transformer employed in the current switch provides isolation of the energy storage components from the load, thereby making a local ground possible. The amount of energy which can be recovered from the energy storage device is also increased.

12 Claims, 7 Drawing Sheets

SUPERCONDUCTIVE VOLTAGE STABILIZER HAVING IMPROVED CURRENT SWITCH

CROSS-REFERENCE TO RELATED APPLICATIONS

This is a continuation-in-part of prior co-pending application Ser. No. 07/385,014 filed Jul. 25, 1989, now U.S. Pat. No. 4,962,354, issued Oct. 9, 1990.

BACKGROUND OF THE INVENTION

1. Field of the Invention

This invention relates to a superconductive voltage stabilizer. In particular, the invention relates to a voltage stabilizer which utilizes the energy stored in a superconducting energy storage coil. In operation, the invention draws energy from a power line, stores that energy in a superconducting energy storage coil, and then processes that energy into a form which can be used for feeding to a load. In this way, the load is isolated from the power distribution lines, and consequently does not induce voltage or current disturbances typically induced when a load draws energy from the power distribution system.

2. Background of the Prior Art

The quality of power delivered by utility systems determines how well electrical and electronic equipment operates. Any disturbances to the power system can severely affect the equipment's performance. Power disturbances typically result from lightning, utility switching and utility outages. Such disturbances can also be created by the users of power through the switching of loads, ground faults, or abnormally high demand from heavy normal equipment operation. In each of these situations, the depletion of power through the line is severe enough to affect the operation of electrical equipment being used by other utility customers. In one example, the fluctuating load of a large welder in a mill producing wire mesh can cause lights and television sets to flicker for approximately 500 residential customers who received their power from the same feeder line used to supply power to the mill. Proposed solutions in this case included powering the equipment by a diesel generator during evening hours or installing a special electric utility line connected directly to the mill at a substantial cost.

The preceding case illustrates that a solution to power line disturbances is to upgrade the utility lines to the source of the excessive load. Such upgrading, however, is an expensive solution. Consequently, various other solutions have been proposed and are currently in use.

Many different types of power conditioning systems have been devised to prevent electrical and electronic equipment from creating or being affected by power line disturbances. Computer systems are particularly sensitive to variations which occur in the power being delivered to such systems. One solution currently being used to protect computer systems is the Uninterruptible Power Supply or UPS. The UPS isolates the computer from the power distribution line so that any changes in delivered power do not affect the computer's operation. The system is designed to automatically provide power without delay or transients during any period when the normal power supply is incapable of performing acceptably. However, the amount of current that can be provided by a UPS is limited. Consequently, such a system is unsuited for use in utility and industrial applications, particularly where motors must be started. For example, the in-rush of current necessary to start a motor is too large to be supplied by a typical UPS.

In the case of motors, electronic motor starters have been successfully employed to start motors. An electronic motor starter reduces the voltage delivered to a motor at start-up thereby decreasing the load seen by the utility system. Although this reduces power line disturbances, it also reduces the current delivered to the motor. In the case where the driven system is a large load, oftentimes the motor will not start because of the reduced input voltage. Motor starters, however, are successfully used to supply smaller currents to motors driving lighter loads.

One recent development in voltage stabilization devices is the Static-VAR Compensator. The Static-VAR Compensator uses a configuration of inductors, capacitors, and high power electronics. These devices are designed to deliver large amounts of reactive power to equipment such as arc furnaces or arc welders. However, Static-VAR Compensators cannot be used to deliver real power during voltage sags or momentary outages.

Another technique to control power disturbances is to store energy when demand is low and return that energy to the power system when demand is high. Battery systems have been used to store energy for this purpose, but battery systems have gained limited use because of various deficiencies. Efficient batteries are quite expensive, and since the amount of energy stored depends on the number of batteries used, large capacity battery systems are prohibitively expensive. Also, most batteries produce hydrogen during operation, and because hydrogen is highly flammable, battery systems can pose serious safety problems.

More recent energy storage techniques employ superconducting technology to store energy to be returned later to the utility system. Peterson U.S. Pat. No. 4,122,512 describes a system storing alternating current power in a superconductive magnet or inductor. Three-phase alternating current is converted to direct current and stored in a superconducting inductor. During periods of high energy demands, the direct current is reconverted to alternating current and delivered back to the three-phase line. In this way, any sudden depletion in line voltage is compensated by the energy stored in the superconducting system.

Higashino, U.S. Pat. No. 4,695,932 discloses an energy storage circuit which converts three-phase alternating current to direct current. The DC current is then stored in a superconductive energy storage coil. A DC capacitor and chopper circuit are used to control the amount of direct current stored in the superconductive energy storage coil. This configuration allows the current capacity of the AC supply line equipment and the thyristor converter to be scaled down in accordance with service power established by the current rating of the coil, and also allows a reduction of operation losses.

Prior art systems have reduced power line disturbances in two ways. One method has been to make a device specifically designed for a particular load such as the UPS for computers or the electronic motor starter for motors. Such systems, although correcting some power line disturbances, have created other problems. Specifically, they are usually load-specific and not interchangeable, and they often cannot supply sufficient current to maintain proper operation of the load.

The other solution has been to install additional power lines or to store energy delivered by power lines during non-peak hours, and return the energy back to the utility system during peak hours, as in the Peterson and Higashino systems. Installing additional power lines, however, is an expensive solution to the problem. Peterson's and Higashino's devices are directed to supplying current to support a large power system and not to correcting the problem at the source, namely the effects of protective devices on the transmission and distribution systems which occur during lightning strikes and faults for example, and the individual devices causing the problem of sudden high-load power consumption from the utility lines. Arc welders, arc furnaces, and motors, for example, each have specific current requirements due to their unique structures. Motors require large amounts of current only at start-up. Arc welders draw power intermittently during periods of welding. Since each piece of electrical machinery has its own individual power requirements, systems which attempt to maintain the power in a utility system generally do not prevent power disturbances, but simply correct overall deficiencies in the power lines when they occur.

OBJECTS OF THE INVENTION

A principal object of the invention is to provide a superconductive voltage stabilizer which delivers energy to a load or to a utility transmission and distribution system to provide voltage support during voltage sags and carry over during system outages.

It is also an object of the invention to provide the exact power necessary to drive a load without compromising the operation of the load utilizing the energy.

A further object of the invention is to provide a reduction in the cost of maintaining the quality of power delivered by utility systems.

Another object of the invention is to provide isolation of the energy storage components from the load, thereby making a local ground possible.

It is still another object of the invention to provide a safer interconnection by separating the current switch and superconducting inductive energy storage coil from the load.

A further object of the invention is to increase the amount of energy recovered from the energy storage coil when connected to a load which requires a lower operating voltage than the rated voltage of the energy storage device.

SUMMARY OF THE INVENTION

These and other objects are achieved by a superconductive voltage stabilizer comprising a superconducting energy storage coil to store direct current obtained from a power system. The stored direct current is selectively delivered to a load or a utility system through the use of a voltage regulator and an energy storage cell. The energy storage cell stores DC energy until it is drawn by the load or a utility system. When the load or utility system removes energy from the energy storage cell, the energy is replenished by the direct current which has been stored in the superconducting energy storage coil. The voltage regulator selectively delivers the direct current from the energy storage coil by monitoring the amount of energy removed from the storage cell. The regulator operates to either direct energy to the energy storage cell or to keep the energy in the superconducting energy storage coil.

The superconductive voltage stabilizer provides energy directly to a load or into the utility system. These configurations prevent the load from causing disturbances in the power system which would affect other consumers, and it maintains the quality of power delivered to a consumer by supplying stored energy back to a power system during times of voltage sags and momentary outages caused by disturbances on the utility network.

An improved current switch controls the release of current stored in a superconducting inductive energy storage coil for selective delivery of the current to the load or the utility system. The improved current switch, under the control of a controller, directs current, provided by a power source, to be stored in the energy storage coil and then either selectively delivers the direct current stored therein to an energy storage cell or keeps the current in the coil. The improved current switch allows for flexibility in the overall design of the Superconductive Voltage Stabilizer. A variety of energy storage coils with different voltage and current specifications can be utilized in the Superconductive Voltage Stabilizer incorporating the improved current switch. The design provides flexibility in the sizing of the superconducting inductive energy storage devices and any related power conditioning equipment, as well greater safety in the operation of an installation using the Superconductive Voltage Stabilizer.

The improved current switch includes a transformer which provides a number of advantages. The transformer isolates the energy storage device and the power supply from DC bus bars, the energy storage cell or the load thereby providing greater safety of operation.

The transformer also offers an advantage when the improved current switch is connected to a load requiring a lower voltage level than the rated voltage level of the energy storage coil. Previously, the current level of the energy storage coil could not drop below the level of current required by the load, thereby limiting the amount of recoverable energy. Now, by using a transformer, the amount of energy which can be recovered from the coil can be substantially increased.

Additionally, selection of the transformer allows for connection to loads requiring higher voltage levels than the rated voltage of the storage coil.

The improved current switch can also be used in any applications which require release of stored energy for selective delivery to a load.

DESCRIPTION OF PREFERRED EMBODIMENTS

Figure 1:
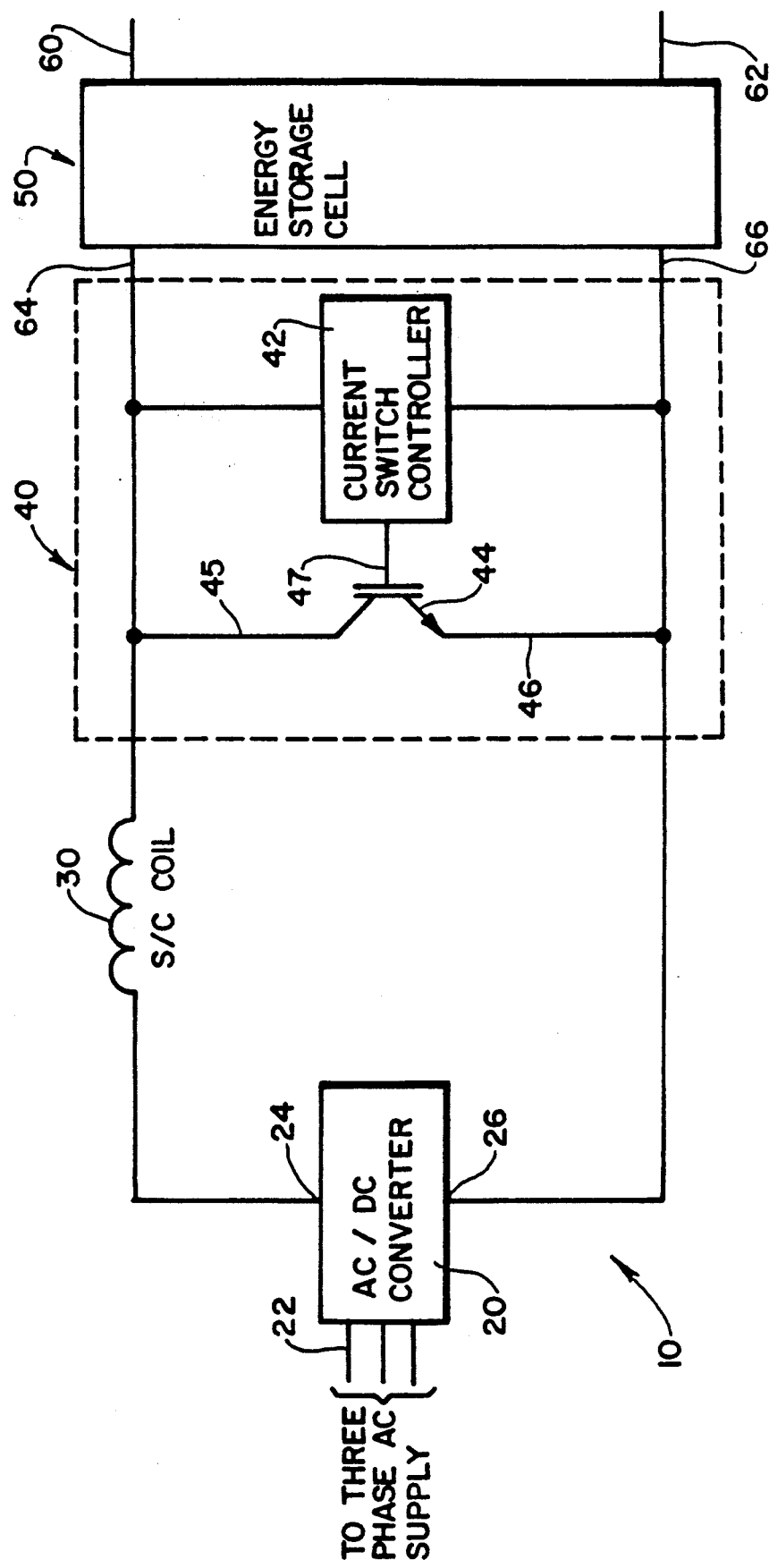
FIG. 1 is a schematic diagram of a superconductive voltage stabilizer construction in accordance wit embodiment of the present invention.

Referring now to FIG. 1, a superconductive voltage stabilizer embodying the present invention is generally designated by the numeral 10. Superconductive voltage stabilizer 10 includes an AC/DC converter 20, a superconducting coil 30, a voltage regulator 40 and an energy storage cell 50.

The superconductive voltage stabilizer 10 has an AC/DC converter for converting alternating current to direct current. Three-phase alternating current provided by an AC supply line is connected to AC input 22 of AC/DC converter 20. AC/DC converter 20 has a first DC terminal 24 and a second DC terminal 26. Once the alternating current input has been converted to direct current, a direct current output is available between the first and second DC terminals.

The direct current is then directed to a superconducting energy storage coil 30, through its connection to one of the DC terminals, which is used to store the energy created by the direct current and developed by AC/DC converter 20. Energy storage coil 30 stores energy depending on the control of voltage regulator 40. In its most basic embodiment, voltage regulator 40 comprises a current switch controller 42 and a current switch 44. AC/DC converter 20 controls the amount of current flowing through superconductive energy storage coil 30. Initially, current switch controller 42 activates current switch 44 so that a current path is created. When current switch 44 is activated, direct current can flow from first DC terminal 24, through energy storage coil 30, through current switch 44 and back through second DC terminal 26.

Once a sufficient amount of energy is stored in coil 30, an externally generated user control signal, described hereinafter in further detail, directs voltage regulator 40 to halt the current path through current switch 44 thereby directing the current through energy storage cell 50. Storage cell 50 comprises, in its most basic form, an energy storage capacitor 52. Energy storage cell 50 is connected in parallel with a load through a first output line 60 and a second output line 62. The voltage regulator 40, through the use of current switch controller 42, deactivates current switch 44 so that a new current path is created. Direct current can then flow from the first DC terminal 24, through energy storage coil 30, through a first input line 64 of energy storage cell 50, through energy storage cell 50, out through a second input line 66 of energy storage cell 50 and back through second DC terminal 26. Thus, energy is stored in energy storage cell 50 until the voltage across the cell 50 reaches a predetermined level. Once that level has been achieved, voltage regulator 40 directs the direct current away from energy storage cell 50 and back through the voltage regulator 40.

When energy storage cell 50 is sufficiently charged, the supply of energy in energy storage cell 50 can be delivered to power a load through a first output line 60 and a second output line 62 of energy storage cell 50. Output lines 60 and 62 cooperate to provide an output current path to the load. As the load draws energy away from energy storage cell 50, the voltage across cell 50, measured between the first input line 64 and the second input line 66 begins to drop. Once the voltage across cell 52 drops to a set level, it is sensed by voltage regulator 40. At that time, current switch controller 42 deactivates current switch 44, so that energy stored in superconducting coil 30 is delivered to energy storage cell 50 and the load. The delivery of stored energy continues until the voltage across energy storage cell 50 reaches a predetermined maximum value. At that point, voltage regulator 40 senses cell 50 is fully charged, and through current switch controller 42, activates current switch 44 so that current flows once again flows through current switch 44.

Current switch 44 can comprise an insulated gate bipolar transistor (IGBT) having a collector lead 45, an emitter lead 46, and a gate lead 47. Collector lead 45 is coupled to first input line 64, emitter lead 46 is coupled to second input line 66, and gate lead 47 is coupled to current switch controller 42, which controls the conduction of IGBT 44 through gate lead 47. Various other devices can be used in place of IGBT 44 and can include gate-turn-off thyristors and silicon controlled rectifiers.

Thus, energy storage cell 50 supplies energy to the load. As energy is drawn from cell 50 by the load, voltage regulator 40 senses the voltage across the cell 50, and controls the amount of energy released from coil 30 to cell 50. A portion of the direct current stored in coil 30 is thereby delivered to energy storage cell 50 in accordance with the energy requirements of the load.

Figure 2:
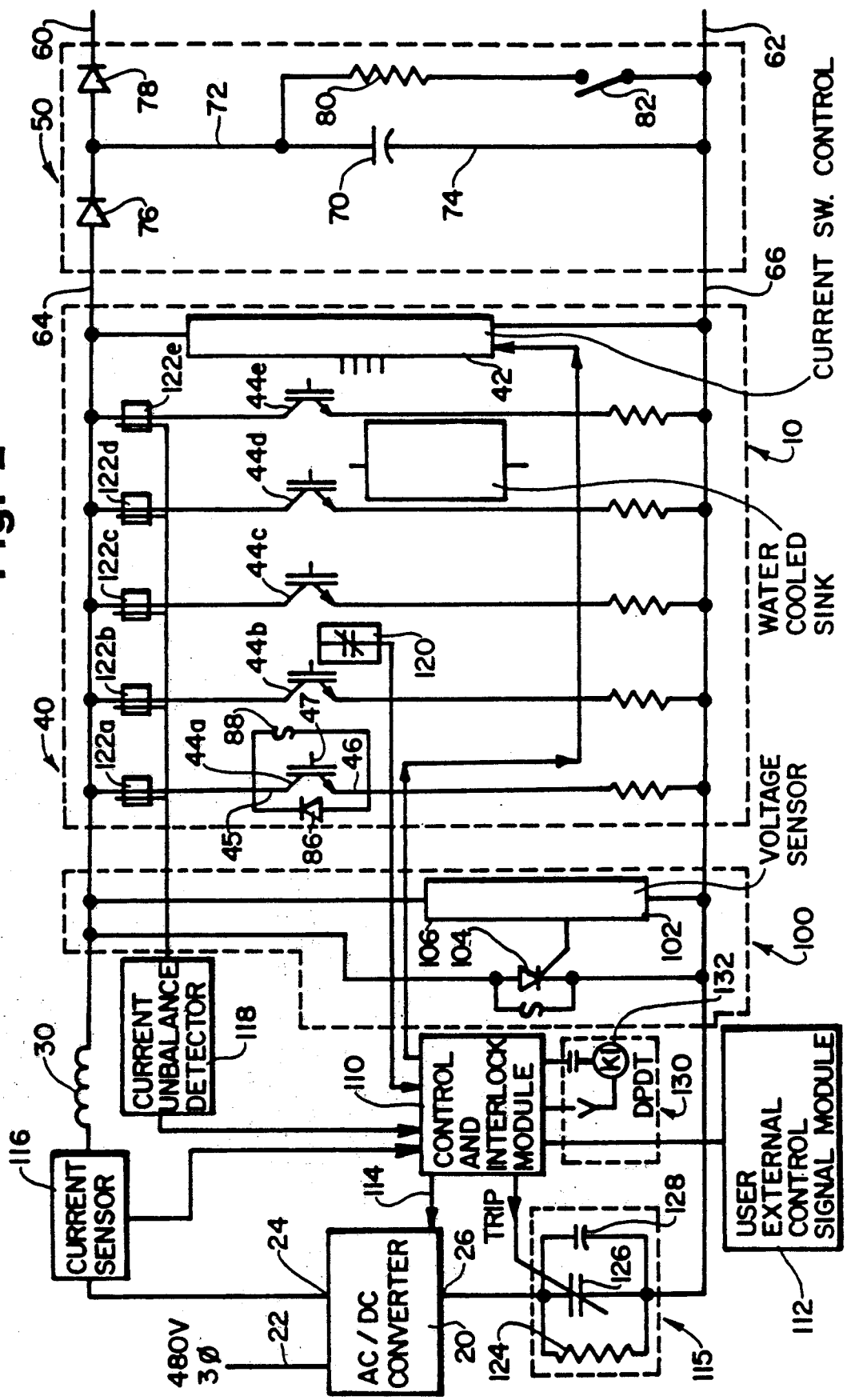
FIG. 2 is a schematic diagram showing another embodiment of the present invention.

FIG. 2 is a circuit diagram of another embodiment of superconductive voltage stabilizer 10. The illustrated superconductive voltage stabilizer 10 includes an AC/DC converter 20, a superconducting energy storage coil 30, a voltage regulator 40 and an energy storage cell 50, all employed previously in the configuration of FIG. 1. The circuit of FIG. 2 also includes additional circuitry which provides a more stable and reliable design.

As shown in FIG. 2, energy storage cell 50 includes an energy storage capacitor 70. Energy storage capacitor 70 has a first terminal 72 and a second terminal 74. First input line 64 is coupled to first terminal 72 through first diode 76 so that the cathode of first diode 76 is connected to first terminal 72 of energy storage capacitor 70. First terminal 72 is also coupled to first output line 60 through a second diode 78. Second diode 78 is oriented such that its anode is connected to first terminal 72. Second terminal 74 is coupled to both second input line 66 and second output line 62.

First diode 76 and second diode 78 are included in energy storage cell 50 to control the direction of energy flow and to protect circuit components. Second diode 78 is included to protect capacitor 72 from any undesirable currents which might be generated by the load and fed back into the superconductive voltage stabilizer 10. First diode 76 provides a similar function, and prevents energy storage capacitor 70 from discharging through current switch 44 thereby protecting the remaining circuitry from undesirable currents, including the voltage regulator 40 and AC/DC converter 20.

Another safety feature included in energy storage cell 50 is resistor 80 and switch 82. Resistor 80 and switch 82 are serially connected and in parallel combination with energy storage capacitor 70. Resistor 80 is a bleeder resistor which, in cooperation with normally open switch 82, is used to dissipate the energy in capacitor 70 whenever the superconducting voltage stabilizer is shut down. When superconductive voltage stabilizer 10 requires maintenance, switch 82 will be closed so that energy stored in capacitor 70 will be dissipated to prevent shock hazard.

FIG. 2 illustrates a circuit diagram for another voltage regulator 40. Current switch controller 42 controls the conduction of five current switches 44a–44e. The number of current switches 44 can vary depending on the amount of current to be conducted and the current capacity of the current switches used. Current switch controller 42 monitors the voltage across first input line 64 and second input line 66 to determine whether current switches 44a–44e should conduct. The circuit also includes watercooled sink 84 to maintain the proper operating temperature of high power current switches 44a–44e.

Protection diode 86 is also included in this circuit to protect current switches or IGBTs 44. Protection diode 86 is connected across the emitter and collector of IGBT 44, with the anode connected to the collector. A snubber 88 is configured in parallel with protection diode 86, and is used to prevent spikes from damaging the circuit.

Figure 3:
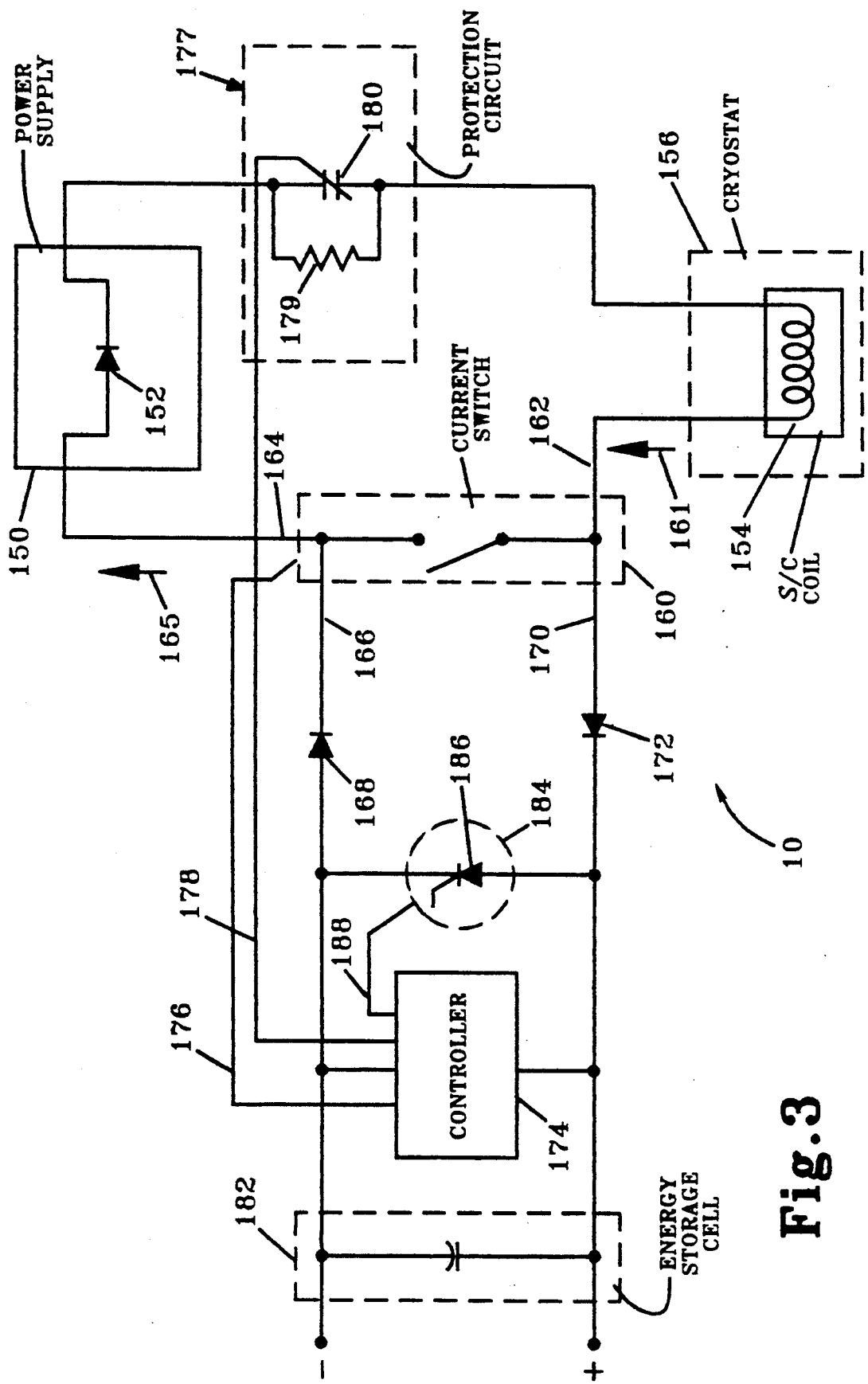
FIG. 3 is a schematic diagram of a superconductive voltage stabilizer drawn to illustrate the location of an improved current switch.

As illustrated in FIG. 2, overvoltage protector 100 is used to monitor the voltage across voltage regulator 40 and energy storage cell 50, and to bypass those circuits when the voltage level becomes unacceptable. Overvoltage protector 100 is connected in parallel with voltage regulator 40 and energy storage cell 50. When the voltage level increases to an unacceptable level, voltage sensor 102, which is in parallel with voltage regulator 40, activates thyristor 104 through the gate thereof. Thyristor 104 conducts, so that a current path is created which bypasses the circuitry of voltage regulator 40 and energy storage cell 50. Thyristor snubber 106 is connected across the anode and cathode of thyristor 104 as illustrated in FIG. 3.

Various control and protection features are handled by control and interlock module 110 of FIG. 2. As described hereinbefore, energy is initially stored in superconducting energy storage coil 30 and later delivered to energy storage cell 50 is initially stored with energy at a time determined by the needs of the driven system. Sometime before the load requires energy, the operator will direct current switch controller 42 to halt the current path through current switches 44, thereby delivering energy to energy storage cell 50. The operator, through user control signal module 112, directs control and interlock module 110 to direct current switch controller 42 to turn off current switches 44. Consequently, the current path which did flow through current switches 44, now flows through energy storage cell 50. Energy is stored in energy storage cell 50 until the voltage across the cell 50 reaches a predetermined level.

The remaining protection features in FIG. 2 are controlled by control and interlock module 110. Interlock module 110 controls AC/DC converter 20 through control line 114 and dump circuit 115. During circuit operation, interlock module 110 monitors the current flowing through the superconducting coil 30 by current sensor or transductor 116. Two characteristics of voltage regulator 40 are also monitored. First, current unbalance detector 118 detects whether the current flowing through current switches 44 vary with respect to one another outside a predetermined range. Secondly, temperature sensor 120 detects the temperature of the watercooled sink 84.

As shown in FIG. 2, current sensor 116 detects the current through superconducting coil 30 by the use of a transducer 116. Transducer 116 determines a current value by sensing the magnetic field created by current flow. When the current value reaches a threshold value, interlock module 110 senses that a limit has been reached and then terminates the conversion of alternating current through control line 114, ceasing the supply of direct current to superconducting coil 30. Current will continue to flow through the coil 30, however, since a current path is provided through AC/DC converter 20.

Current unbalance detector 118 detects the current through the current switches 44a–44e by cores 122a through 122e. If the current conducted through any of switches 44a–44e is greater or less than a predetermined value of current being conducted through any other of switch 44a–44e, interlock module 110 detects this difference and trips the dump circuit 115. Dump circuit 115 comprises the parallel combination of dump resistor 124, normally closed dump switch 126, and dump capacitor 128. When tripped, normally closed dump switch 126 opens so that current flows through a parallel combination of dump resistor 124 and dump capacitor 128.

Temperature sensor 120 detects the temperature of watercooled sink 84. If the temperature reaches a high level, indicating that current switches 44a–44e are operating improperly, interlock module 110 trips dump circuit 112 to prevent circuit damage.

Interlock module 110 is also provided with service module 130, which consists of a user accessible double-pole double-throw switch 132. Switch 132 can be actuated to close switch 82, thereby bleeding off the energy on energy storage capacitor 70 so that tests or repair work may be safely performed.

FIG. 3 is a circuit diagram of the superconductive voltage stabilizer 10 having an improved current switch. This embodiment of the superconductive voltage stabilizer includes an AC/DC converter or power supply 150 having a free-wheel diode 152 connected as shown for providing protection from switching transients as would be understood by one skilled in the art. The power supply 150 provides energy to a superconducting inductive energy storage device or coil 154 which is contained in a cryostat 156 thereby maintaining the superconducting properties of the coil 154.

Connected in series with the power supply 150 and the coil 154 is an improved current switch 160. The improved current switch operates to control the delivery of current to a load as previously described herein. Current direction through the switch is illustrated by an arrow 161. The improved current switch 160 is coupled through a first line 162 to the coil 154 and through a second line 164 to the power supply 150. Current direction through the second line 164 is indicated by an arrow 165. A third line 166 is coupled to the cathode of a first diode 168. A fourth line 170 is coupled to the anode of a second diode 172. The first and second diodes 168 and 172 provide circuit protection by allowing current to flow in only one direction through the circuit.

A controller 174 embodying the control functions previously described is connected to the anode of the first diode 168 and the cathode 172 of the second diode. Of course, should these diodes be left out of the circuit, the controller is coupled in parallel with the improved current switch 160 through the third line 166 and the fourth line 170. The controller 174 through a line 176 controls the operation of the improved current switch 160 as previously described.

The controller 174 also controls a protection circuit 177 through a line 178. The protection circuit 177 is connected in series with the power supply 150, the coil 154, and the improved current switch 160. A dump resistor 179 is connected in parallel with a break switch 180. In the event of a malfunction, this circuit provides a means for dissipating any energy remaining in the superconducting coil through the dump resistor 179. Connected in parallel with the controller 174 is an energy storage cell 182 or capacitance bank whose function is as previously described. A DC bus bar or variable speed drive could also be used in place of the energy storage cell 182. A crowbar circuit 184 which includes a thyristor 186 provides overvoltage protection for the controller 174, the energy storage cell 182 and coil 154 through a control line 188. Should the controller sense a malfunction, the thyristor 184 is turned on through the control line 188, thereby creating an alternate current path around the controller 174, switch 160 and storage cell 182.

Figure 4:
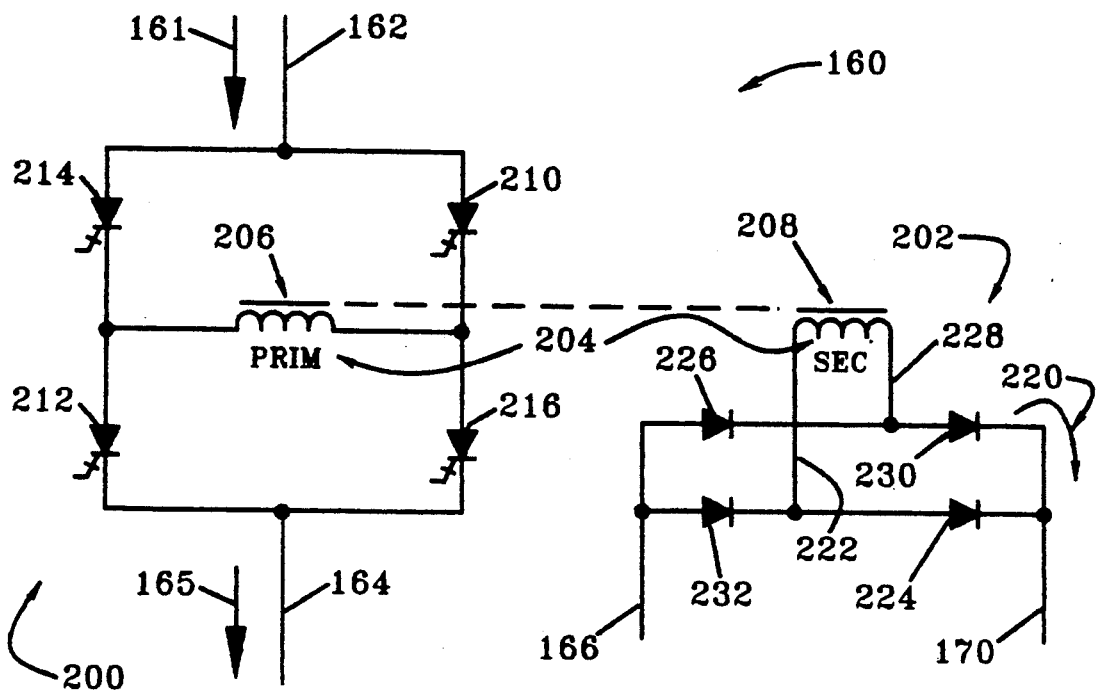
FIG. 4 is a schematic diagram of one embodiment of an improved current switch.

FIG. 4 illustrates one embodiment of the improved current switch 160. The arrow 161 illustrates the direction of current through the current switch 160 also as shown in FIG. 3. Current switch 160 includes a primary circuit 200 and a secondary circuit 202. The primary circuit 200 and the secondary circuit 202 are coupled together by a transformer 204 having a primary winding 206 and a secondary winding 208.

The primary circuit 200 includes a first gate turn-off device (GTO) 210, a second GTO 212, a third GTO 214, and a fourth GTO 216. The GTOs are turned on and off in a specified sequence by the controller 174 through the control line 176, representing a plurality of control lines each connected to the gates of the GTOs as would be understood by one skilled in the art, to alternate or reverse the direction of the current flow through the primary winding 206.

To control the direction of current flow through the primary winding 206, the first GTO 210 and the second GTO 212 are turned on while the third GTO 214 and the fourth GTO 216 are turned off. During this cycle, current flows through the first line 162, the first GTO 210, the primary winding 206, the second GTO 212 and out through the second line 164 back to the power supply 150. After this cycle, the direction of current flow through the transformer is reversed by turning off the first and the second GTOs 210 and 212 and turning on the third GTO 214 and the fourth GTO 216. By alternating this sequence of turning on and off GTOs, the current delivered from the coil 154 is alternated through the primary 206 of the transformer 204, while still maintaining the same direction of the flow of current through the series circuit of the power supply 150, the coil 154 and the current switch 160.

By varying the direction of current through the primary winding of the transformer 204, a current is induced in the secondary winding 208 when a load is connected to the third line 166 and the fourth line 170. The induced current, however, also alternates due to the current alternating in the primary winding 206. Because the Superconductive Voltage Stabilizer is directed to supplying direct current through the fourth line 170, the alternating character of the current must be changed. To make this transformation, the direction of current flow induced in the secondary winding 208 is altered by a series of four current valves or diodes.

When the first GTO 210 and the second GTO 212 are on, the direction of current flow through the primary winding 206 and the secondary winding 208 is to the left as illustrated. An arrow 220 indicates the preferred direction of current flow through the fourth line 170 for delivery to the load. To obtain this direction of current flow while the induced current is flowing to the left as shown, a first winding lead 222 is coupled to the anode of a first diode 224. Since the cathode of the first diode 224 is coupled to the fourth line 170, current flows in the proper direction through the fourth line 170. The current return path is through the third line 166 which is coupled to the anode of a second diode 226. The cathode of the second diode is connected to a second winding lead 228 of the secondary winding 208 which completes the current path for the current as it flows to the left through the primary winding 206.

When the current through the primary winding 206 reverses direction, the third GTO 214 and the fourth GTO 216 are turned on and the remaining two GTOs are turned off. The current flow direction is now to the right as illustrated through both the primary winding 206 and the secondary winding 208. To maintain the proper direction of current through the fourth line 170, the second winding lead 228 is also coupled to the anode of a third diode 230 whose cathode is coupled to the fourth line 170. The current returns through the third line 166 which is coupled to the anode of a fourth diode 232 whose cathode is coupled to the first winding lead 222. In this way, while current through the secondary winding 208 alternates direction, the current flowing through the fourth line 170 always flows in the direction indicated by the arrow 220.

Figure 5:
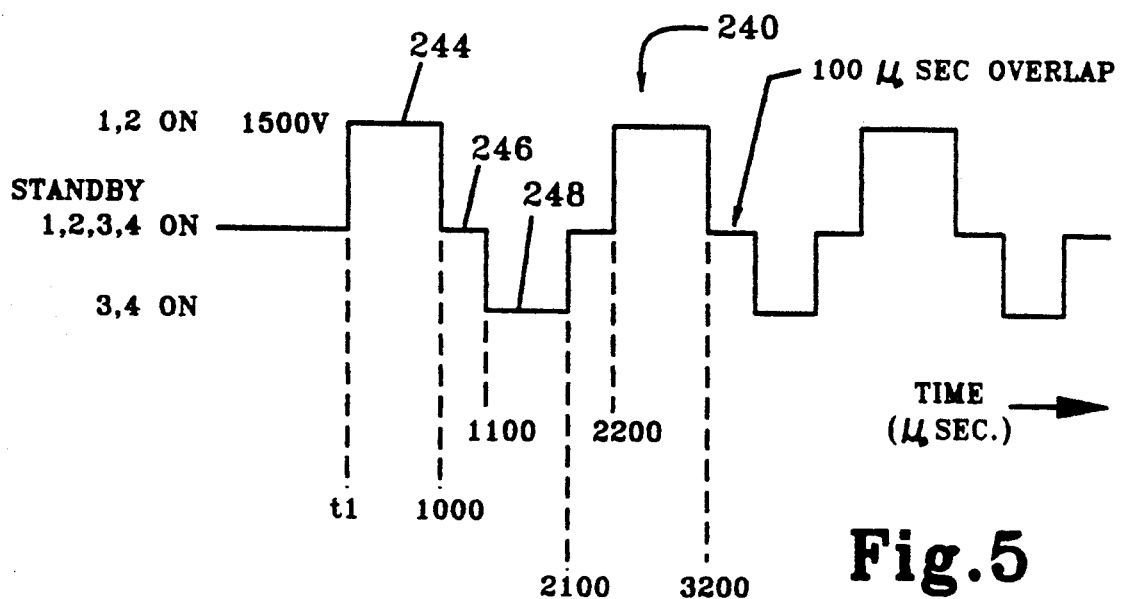
FIG. 5 is a timing diagram showing the switching sequence of the primary circuit of the improved current switch illustrated in FIG. 4.

FIG. 5 illustrates a waveform 240 of the voltage at the primary winding 206 when operated with the superconducting coil rated at 1000 amps and 1500 volts. The coil is rated at these levels to deliver energy to the DC link of a variable speed drive rated at 750 volts DC± 100 volts DC. The transformer 204 has a turn ratio of two turns in the primary winding to one turn in the secondary winding. The remaining preliminary specifications for the transformer are shown in Table 1. The GTOs chosen in the prototype model are Mitsubishi 3000 volt, 1250 or 1570 amp (RMS) or similarly sized devices. The switching frequency should be as high as possible (approximately 1 kHz) to reduce the cost and size of the transformer.

TABLE I

| Preliminary Transformer Specifications For The Improved Current Switch |
| --- |
| Turn ratio: primary 2, secondary 1 |
| Peak primary current - 1000 A |
| Peak secondary current - 2000 A |
| Peak primary voltage - 1500 V |
| Peak secondary voltage - 750 V |
| Duty cycle: Assume 1 outage of 2 seconds every 5 minutes, which means an average |
| kVA = approximately (2/5 × 60) 750 × 2 = 10 kVA |
| Instantaneous peak kVA = approximately 1500 kVA |
| Operating frequency 500 Hz minimum, 1000 Hz maximum |
| Rated primary to secondary operating voltage - 1500 VAC |
| Primary to secondary test voltage 1 min = 3000 VAC |
| Use a tape wound, silectron cut core |
| Place the primary inside the secondary winding to get the primary leakage reactance low |
| Primary leakage reactance as low as possible |
| Steel peak induction - 12,000 gauss, 4 mil grain |

TABLE I-continued

Preliminary Transformer Specifications For
The Improved Current Switch oriented
Primary to secondary voltage drop from 0 to
instantaneous peak load <5%
Cooling air, 50° C. ambient, sea level
Transformer temperature rise - 100° C. max.
Insulation class H The transformer offers a significant advantage when the improved current switch is connected to a load requiring a lower voltage level than the rated voltage level of the energy storage device as in this particular embodiment. Previously, the current level of the energy storage cell could not drop below the level of current required by the load. For instance, if the load requires 750 volts DC and 800 amps DC of current, a 1000 amp capacity energy storage coil could not be discharged below 800 amps since the load requires that amount of current. The remainder of the energy stored as current remains in the storage coil as unusable. Now, by using a transformer, the amount of energy which can be recovered from the coil can be substantially increased.

A transformer having a 2:1 primary to secondary turns ratio used with a coil rated at 1000 amps and 1500 volts doubles the amount of energy which can be recovered from the coil. This significant increase in recoverable energy results from the transformer's ability to deliver twice as much current at half the rated voltage level of the coil. Consequently, the minimum level of current remaining in the coil is now 400 amps instead of 800 amps.

The waveform of FIG. 5 further illustrates the timing sequence for turning on and off the first, second, third, and fourth GTOs 210, 212, 214, and 216. The timing sequence begins with all four of the GTOs turned on so that no current flows in the primary winding 206 as shown at point 242. To begin the cycle of alternating current through the primary winding 206, the first and second GTOs 210 and 212 are kept on and the third and fourth GTOs 214 and 216 are turned off. The voltage level across the primary winding 206 is 1500 volts as shown at point 244. Once the first and second GTOs have been on for 1000 microseconds, third and fourth GTOs 214 and 216 are turned on so that all four GTOs are on for a period of 100 microseconds as seen at point 246. Then the first and second GTOs are turned off with the third and fourth GTOs remain on for a period of 1000 microseconds at point 248. This sequence repeats itself with the direction of current alternating back and forth with a period of zero current flow between each alternation.

The period of zero voltage flow as shown at point 246 is necessary because the transformer contains some stored energy at the time the direction of current flow is reversed. Because constant current can never be interrupted, the stored energy needs to be dissipated before the current flow can be reversed through the primary winding 206. The time for dissipation, in this particular instance using this particular coil, takes approximately 100 microseconds. Of course, in other applications using different transformers and using superconducting inductive energy storage coils having different voltage and current ratings, the exact time spent in each portion of the of the generated square wave would necessarily change. There is, however, always some time period between periods of current flow through the transformer in which all four GTOs are turned on to allow the stored energy to dissipate.

While the current embodiment uses GTOs, the invention is not restricted to this particular type of device. Any type of controllable unidirectional current valve can be used if the power requirements are met. The present invention could also use power transistors and Insulated Gate Bipolar Transistors (IGBT) as long as the power handling requirements of the particular application are met.

Figure 6:
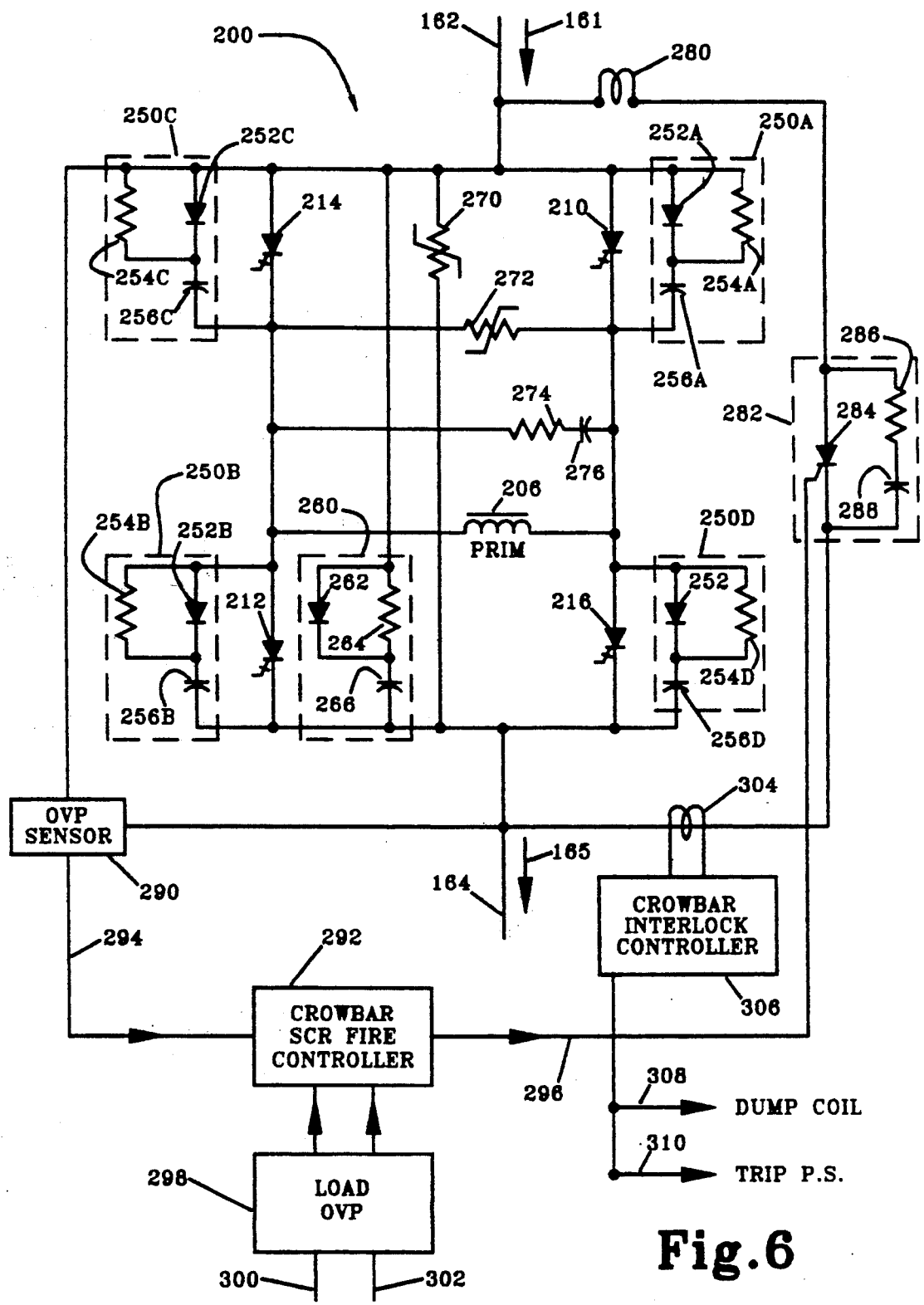
FIG. 6 is a schematic diagram of another embodiment of the improved current switch.

FIG. 6 illustrates a circuit diagram of the primary circuit 200 including additional protection circuitry. Each of the first, second, third, and fourth GTOs 210, 212, 214, and 216 is protected by a snubber circuit 250 A, B, C, and D respectively. Each snubber circuit contains the parallel combination of a diode 252 and a resistor 254 in series combination with a capacitor 256. Each of the individual snubber circuits are connected across their associated GTO. The snubber circuits provide protection against transients as would be understood by one skilled in the art.

Additional transient suppression is provided by a snubber circuit 260 which includes the parallel combination of a diode 262 and resistor 264 in series combination with a capacitor 266.

Additional snubbers include a snubber 270 in parallel combination with the first GTO 210 and the fourth GTO 216. At present, the snubber chosen is a Midwest #GRV3A5(X). Another snubber 272 of the same type, is connected in parallel to the primary winding 206.

The series combination of a resistor 274 and a capacitor 276 is connected in parallel with the snubber 274 for additional circuit protection.

Connected across the entire primary circuit 200 between the first line 162 and the second line 164 is the series combination of a soaking reactor or di/dt reactor 280 and a crowbar circuit 282. The crowbar circuit 282 comprises a silicon controlled rectifier (SCR) 284 in parallel with a series combination of a resistor 286 and a capacitor 288. The crowbar circuit 282 is used to protect the primary circuit 200 when excessive voltage is sensed between the first line 162 and the second line 164 by an overvoltage protection (OVP) sensor 290. When excessive voltage is detected, a crowbar SCR fire controller 292 receives a signal indicating this state from the OVP sensor 290 through a line 294. In such a situation, the crowbar SCR fire controller 292 turns on the SCR 284 through a line 296. The soaking reactor 280 slows the rate of rise of the current enough to prevent damage to the crowbar circuit 282.

The crowbar SCR fire controller 292 can also be triggered by a load overvoltage protection (OVP) 298 which would sense excessive load voltage present across a first sense line 300 and a second sense line 302 which are connected appropriately across a load.

If the current flowing through the SCR 284, as sensed by a current sensor 304 exceeds a predetermined value, in this case 10 amps, a crowbar interlock controller 306 coupled to the current sensor 304 will send control signals to a variety of other protective devices whose functions include dumping the current from the coil 154 through a dump coil line 308 and turning off the power supply 150 through a trip power supply line 310.

Figure 7:
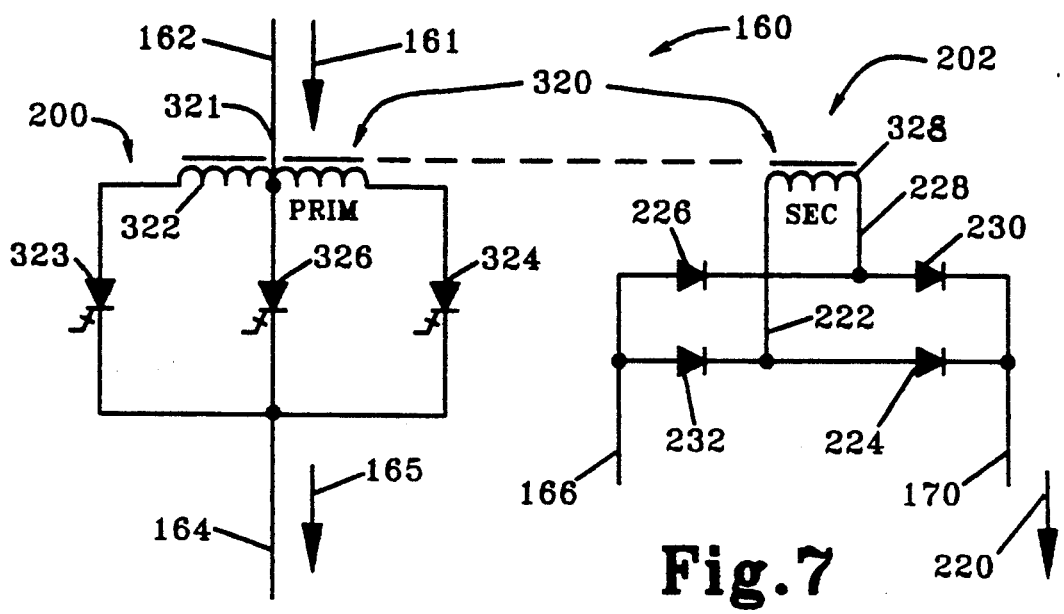
FIG. 7 is a schematic diagram of another embodiment of the improved current switch.

FIG. 7 illustrates an alternative embodiment of the current switch 160 having a primary circuit 200 and a secondary circuit 202. While the secondary circuit is essentially unchanged, the primary circuit 200 uses a center tap transformer 320 and a plurality of three GTOs instead of the four GTOs of the previous embodiment.

In operation, the first line 162 is coupled to a center tap 321 of a primary winding 322 of the center tap transformer 320. A first GTO 323 is connected across the left end of the primary winding 322 and the second line 164. A second GTO 324 connects the right end of the primary winding 322 and the second line 164, while a third GTO 326 connects the center tap 321 to the second line 164. In the three GTO embodiment, the direction of current flow is alternated through each side of the primary winding 322 of the center tap transformer 320.

Initially, all three of the GTOs are turned on so that direct current flows through each of the GTOs. To alternate the direction of current through each of the sides of the primary winding 322, the first GTO 323 is turned on while the second GTO 324 and the third GTO 326 remain off. As previously described, before changing the direction of current flow, the stored energy in the transformer must be allowed to dissipate. To accomplish this dissipation, the first GTO 323, the second GTO 324 and third GTO 326 are turned on for a period of approximately 100 microseconds. Of course, this period of time will vary according to the specific constraints of a particular system. At the end of this period, the second GTO 324 is turned on while the first and third GTOs 323 and 326 are turned off.

A secondary winding 328 of the center tap transformer 321 is connected to the secondary circuit 202 as previously described in FIG. 4.

Figure 8:
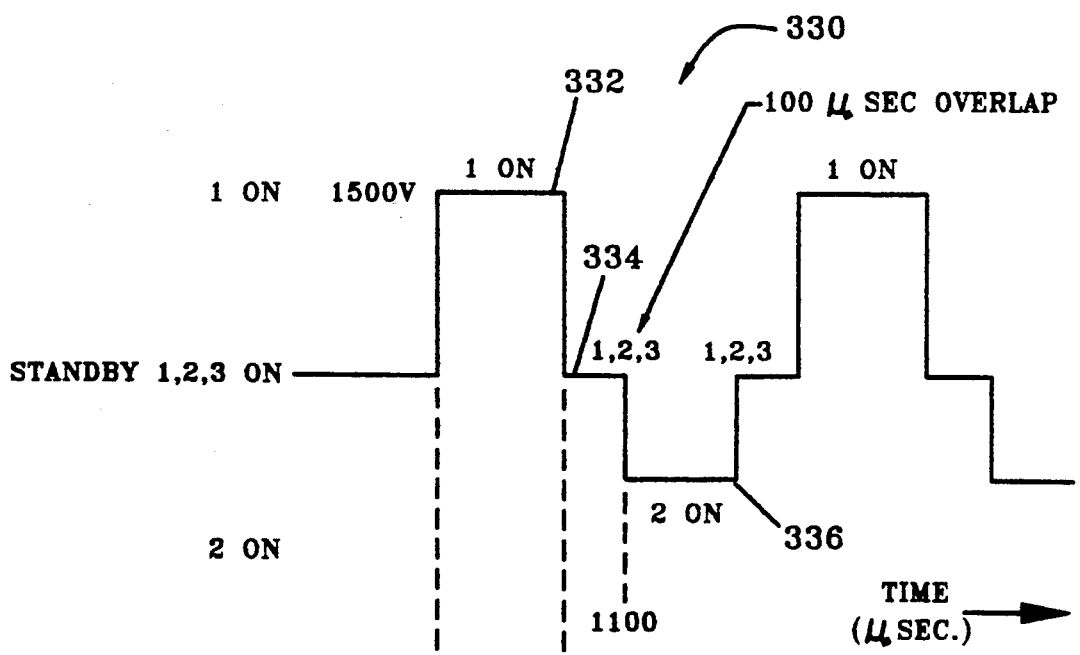
FIG. 8 is a timing diagram of the switching sequence of the primary circuit of the improved current switch illustrated in FIG. 7.

FIG. 8 illustrates a waveform 330 of the voltage at the primary winding 322 when operated with a superconducting coil rated at 1000 amps and 1500 volts. The waveform further illustrates the timing sequence for turning on and off of the first, second, and third GTOs 323, 324, and 326. The timing sequence begins with all of the GTOs turned on. To begin the cycle of alternating the direction of current flow through the primary winding 322, the first GTO 323 is turned on and the second and third GTOs 324 and 326 are turned off. The voltage level across the primary winding 321 is 1500 volts as shown at point 332. Once the first GTO 323 has been on for 1000 microseconds, second and third GTOs 324 and 326 are turned on so that all three GTOs are on for a period of 100 microseconds at point 334. Then the first and third GTOs are turned off with the second GTO 324 remaining on for a period of 1000 microseconds at point 336. This sequence repeats itself with the direction of current alternating back and forth with a period of zero current flow between each alternation.

Figure 9:
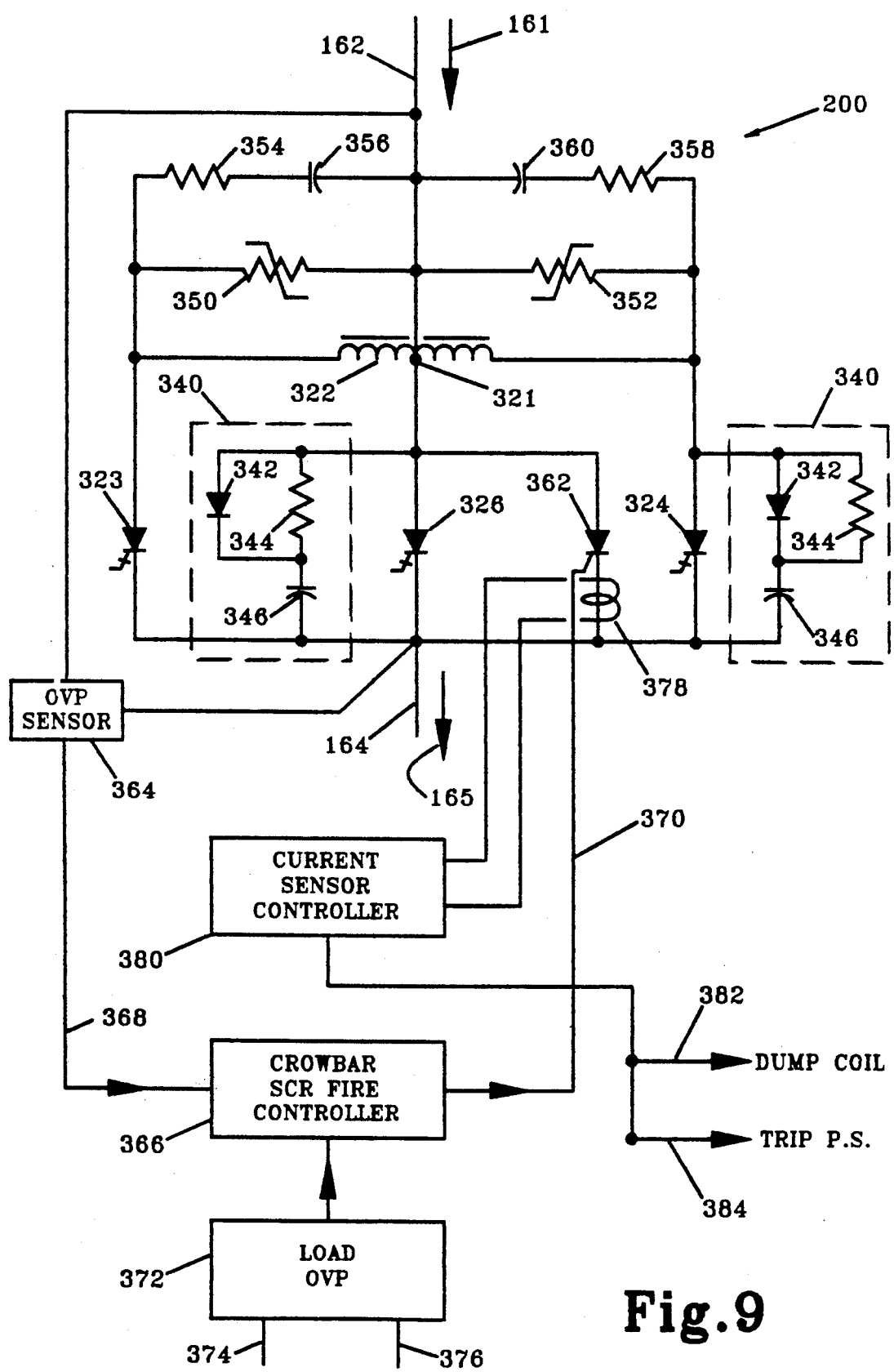
FIG. 9 is a another embodiment of the improved current switch.

FIG. 9 illustrates a circuit diagram of the primary circuit 200 including additional protection circuitry for the circuit of FIG. 7. Each of the first, second, and third GTOs 323, 324, and 326 are coupled to a snubber circuit 340. The snubber circuit for the first GTO 323 is not shown. Each snubber circuit contains the parallel combination of a diode 342 and a resistor 344 in series combination with a capacitor 346. Each of the individual snubber circuits are connected across their associated GTO as previously described. The snubber circuits provide protection against transients as would be understood by one skilled in the art.

Additional snubbers include a snubber 350 in parallel combination with the left side of the primary winding 322 and a snubber 352 in parallel combination with the right side of the primary winding 322. At present, this snubber is a Midwest #GRV3A5(X).

The series combination of a resistor 354 and a capacitor 356 is connected in parallel with the snubber 350 for additional circuit protection. A similar circuit containing a resistor 358 and a capacitor 360 is coupled across snubber 352.

An SCR 362 is connected in parallel with the third GTO 326. The SCR 362 is used to protect the primary circuit 200 when excessive voltage is sensed between the first line 162 and the second line 164 by an overvoltage protection (OVP) sensor 364 as previously described herein. The SCR 362 can be protected by additional protection circuitry as described herein and as would be understood by one skilled in the art. When excessive voltage is detected, a crowbar SCR fire controller 366 receives an indication of this state from the OVP sensor 364 through a line 368. In such a situation, the crowbar SCR fire controller 366 turns on the SCR 362 through a line 370.

The crowbar SCR fire controller 366 can also be triggered by a load overvoltage protector 372 which would sense excessive voltage present across a first sense line 374 and a second sense line 376 which are connected appropriately across the load.

If the current flowing through the SCR 362, as sensed by a current sensor 378 exceeds a predetermined value, a current sensor controller 380 coupled to the current sensor 378 will send control signals to a variety of other protective devices whose functions include dumping the current from the coil 154 through a dump coil line 382 and turning off the power supply 150 through a trip power supply line 384.

The foregoing description of the invention has been presented for purposes of illustration and description. It is not intended to limit the invention to the precise forms disclosed, and obviously many modifications and variations are possible in light of the above teachings.

What is claimed is:

1. A superconductive voltage stabilizer for storing energy in a superconducting inductive energy storage device and for releasing the stored energy to a load, said superconductive voltage stabilizer comprising:
    a first output line and a second output line, said first and said second output lines coupled to the load and cooperating to provide an output current path to the load;
    a controller connected in parallel with said first output line and said second output line;
    a current switch connected in parallel with said controller; and
    a power supply producing a direct current output, said power supply including a first DC terminal and a second DC terminal, said first DC terminal coupled to one side of said current switch through the superconducting inductive energy storage device, and said second DC terminal coupled to the other side of said current switch, whereby said current switch under the control of said controller either directs the current produced by said power supply to be stored in said superconducting inductive energy storage device or directs the current stored in said superconducting energy storage device for delivery to the load through said first and said second output lines.

2. The superconductive voltage stabilizer of claim 1 wherein said current switch comprises:
    a first inductor for carrying current;
    a second inductor for carrying current;

means for alternating the direction of the flow of current through said first inductor;

means for magnetically coupling said first inductor to said second inductor;

means for coupling said second inductor to said first output line and said second output line for developing a load current in said second inductor; and means for directing said developed load current in a single direction through said output current path.

3. The superconductive voltage stabilizer of claim 1 wherein said current switch comprises:

a center tap transformer having a primary winding and a second winding, said primary winding including a first end, a second end, and a center tap, said second winding including a first end and a second end;

a first input line and a second input line, said first and said second input lines cooperating to provide an input current path;

a first output line and a second output line, said first and said second output lines cooperating to provide an output current path;

first circuit means for alternating the direction of the flow of current through said primary winding, said first circuit means coupled to said first input line and said second input line, said first circuit means including said primary winding of said transformer, said center tap coupled to said first input line; and second circuit means for directing current in a single direction through said output current path, said second circuit means coupled to said first output line and said second output line, said second circuit means including said secondary winding of said transformer.

4. A superconductive voltage stabilizer for storing energy in a superconducting inductive energy device and for releasing the stored energy to a load, said superconductive voltage stabilizer comprising:

an energy storage cell for supplying energy to a load, said energy storage cell having a first input line, a second input line, a first output line, and a second output line, said output lines coupled to said load and cooperating to provide an output current path to said load;

a current switch comprising first and second input terminals, first and second output terminals, and a control line means for receiving input signals controlling the operation of said current switch, said first and second output terminals connected to said first and second input lines of said energy storage cell;

a controller connected to said control lines means; and a superconducting energy storage circuit means for delivering stored energy to said energy storage cell under control of said current switch, said superconducting energy storage circuit means comprising an AC input, a DC output, a power supply producing a direct current, and said superconducting inductive energy device, said power supply in circuit with said superconducting inductive energy device, and said DC output connected to said first and second input terminals of said current switch.

5. The superconductive voltage stabilizer of claim 4 wherein said current switch comprises:

a first inductor for carrying current;

a second inductor for carrying current;

means for alternating the direction of the flow of current through said first inductor, said means for alternating connected to said first input terminal and to said second input terminal;

means for magnetically coupling said first inductor to said second inductor;

means for coupling said second inductor to said first output terminal and to said second output terminal for developing a load current in said second inductor; and means for directing said developed load current in a single direction through said output terminal and said second output terminal.

6. The superconductive voltage stabilizer of claim 4 wherein said current switch comprises:

a transformer having a primary winding and a secondary winding;

first circuit means for alternating the direction of current through said primary winding, said first circuit means coupled to said first input terminal and to said second input terminal, said first circuit means coupled to said primary winding of said transformer, said primary winding having a first and a second end; and second circuit means for directing current in a single direction through said output terminal and said second output terminal, said second circuit means coupled to said first output terminal and to said second output terminal, said second circuit means including said secondary winding of said transformer, said secondary winding having a first and a second end.

7. The superconductive voltage stabilizer of claim 6 wherein said second circuit means includes:

a first current valve having one end coupled to said first output terminal and the other end coupled to said first end of said secondary winding;

a second current valve having one end coupled to said first end of said secondary winding and the other end coupled to said second output terminal;

a third current valve having one end coupled to said first output terminal and the other end coupled to said second end of said secondary winding; and a fourth current valve having one end coupled to said second end of said secondary winding and the other end coupled to said second output terminal.

8. The superconductive voltage stabilizer of claim 6 wherein said first circuit means comprises:

a first controllable unidirectional current valve, said first controllable unidirectional current valve including a first lead and a second lead, said first lead coupled to said first end of said primary winding and said second lead coupled to said first input terminal;

a second controllable unidirectional current valve, said second controllable unidirectional current valve including a first lead and a second lead, said first lead coupled to said second end of said primary winding and said second lead coupled to said first input terminal;

a third controllable unidirectional current valve, said third controllable unidirectional current valve including a first lead and a second lead, said first lead coupled to said second input terminal and said second lead coupled to said first end of said primary winding; and a fourth controllable unidirectional current valve, said fourth controllable unidirectional current valve including a first lead and a second lead, said first lead coupled to said second input terminal and said second lead coupled to said second end of said primary winding.

9. The superconductive voltage stabilizer of claim 8, wherein said first, second, third, and fourth controllable unidirectional current valves are GTOs.

10. The superconductive voltage stabilizer of claim 4 wherein said current switch comprises:
   a center tap transformer having a primary winding and a secondary winding, said primary winding including a first end, a second end, and a center tap, said secondary winding including a first end and a second end;
   first circuit means for alternating the direction of the flow of current through said primary winding, said first circuit means coupled to said first input terminal and to said second input terminal, said first circuit means including said primary winding of said transformer and said center tap is coupled to said first input terminal; and
   second circuit means for directing current in a single direction through said first output terminal and said second output terminal, said second circuit means coupled to said secondary winding of said transformer.

11. The superconductive voltage stabilizer of claim 10 wherein said first circuit means comprises:
   a first controllable unidirectional current valve, said first controllable unidirectional current valve including a first lead and a second lead, said first lead coupled to said second input terminal and said second lead coupled to said center tap of said primary winding;
   a second controllable unidirectional current valve, said second controllable unidirectional current valve including a first lead and a second lead, said first lead coupled to said second input terminal and said second lead coupled to said first end of said primary winding; and
   a third controllable unidirectional current valve, said third controllable unidirectional current valve including a first lead and a second lead, said first lead coupled to said second input terminal and said second lead coupled to said second end of said primary winding.

12. The superconductive voltage stabilizer of claim 11 wherein said second circuit means comprises:
   a first current valve having one end coupled to said first output terminal and the other end coupled to said first end of said secondary winding;
   a second current valve having one end coupled to said first end of said secondary winding and the other end coupled to said second output terminal;
   a third current valve having one end coupled to said first output terminal and the other end coupled to said second end of said secondary winding; and
   a fourth current valve having one end coupled to said second end of said secondary winding and the other end coupled to said second output terminal.

* * * * *